(12) United States Patent
Lee et al.

(10) Patent No.: US 9,487,604 B2
(45) Date of Patent: Nov. 8, 2016

(54) BIMETALLIC COBALT-ALUMINUM ADDUCT CATALYST SYSTEM FOR PREPARING HIGH TRANS-1,4-POLYBUTADIENE

(71) Applicant: Korea Kumho Petrochemical Co., Ltd., Seoul (KR)

(72) Inventors: Hanbaek Lee, Daejeon (KR); Gwanghoon Kwag, Daejeon (KR); Hoochae Kim, Daejeon (KR); Seunghyun Do, Suwon-si (KR); Bunyeoul Lee, Suwon-si (KR); Jihae Park, Hwaseong-si (KR); Ahreum Kim, Anyang-si (KR)

(73) Assignee: Korea Kumho Petrochemical Co., Ltd., Jongno-gu, Seoul (KR)

( * ) Notice: Subject to any disclaimer, the term of this patent is extended or adjusted under 35 U.S.C. 154(b) by 205 days.

(21) Appl. No.: 14/089,646

(22) Filed: Nov. 25, 2013

(65) Prior Publication Data

US 2015/0148503 A1  May 28, 2015

(51) Int. Cl.
*C08F 4/00* (2006.01)
*C08F 36/00* (2006.01)
*C08F 136/06* (2006.01)

(52) U.S. Cl.
CPC .................................. *C08F 136/06* (2013.01)

(58) Field of Classification Search
CPC .................. C08F 4/00; C08F 36/00
USPC .......... 502/171, 332, 117, 156; 526/90, 154, 526/335
See application file for complete search history.

(56) References Cited

U.S. PATENT DOCUMENTS

| | | |
|---|---|---|
| 5,025,059 A | 6/1991 | Mouri et al. |
| 5,089,574 A | 2/1992 | Castner |
| 5,448,002 A | 9/1995 | Castner |
| 5,626,697 A | 5/1997 | Sandstrom et al. |
| 5,753,761 A | 5/1998 | Sandstrom et al. |
| 5,834,573 A | 11/1998 | Castner |
| 6,310,152 B1 | 10/2001 | Castner |
| 6,581,659 B1 | 6/2003 | Zanzig et al. |
| 6,608,154 B2 | 8/2003 | Halasa et al. |
| 6,617,406 B2 | 9/2003 | Castner |
| 6,617,460 B1 | 9/2003 | Anderson et al. |
| 6,765,063 B2 | 7/2004 | Sandstrom et al. |
| 2003/0065114 A1* | 4/2003 | Castner ................ C08F 136/06 526/171 |

FOREIGN PATENT DOCUMENTS

JP   46-2833   1/1971

OTHER PUBLICATIONS

Ji Hae Park et al., *Butadiene Polymerization Catalyzed by Tri(aryloxo)aluminum Adduct of Cobalt Acetate*, Bull. Korean Chem. Soc. 2012, vol. 33, No. 12.
G. Natta et al., *Thermodynamic Data on Transtactic Polybutadiene*, Rubber Plastics Age Jan. 1963, vol. 44, No. 1, pp. 42-43, Rubber & Technical Press Limited, Gaywood House, London.

* cited by examiner

*Primary Examiner* — Alexa Neckel
*Assistant Examiner* — Elizabeth Eng

(57) ABSTRACT

The present invention relates to preparing high 1,4-trans-polybutadiene by polymerizing 1,3-butadiene or a butadiene derivative in a non-polar solvent in the presence of a catalyst system comprising a novel bimetallic cobalt-aluminum adduct, which makes it possible to prevent gel formation, control the molecular weight of the trans-polybutadiene and increase the trans content of the trans-polybutadiene. The catalyst system comprising the novel cobalt-aluminum adduct has a high oxidation state and structural stability, and the reactivity of the catalyst is controlled using novel activation systems comprising various allyloxy aluminum compounds.

11 Claims, 3 Drawing Sheets

BIMETALLIC COBALT-ALUMINUM ADDUCT CATALYST SYSTEM FOR PREPARING HIGH TRANS-1,4-POLYBUTADIENE

BACKGROUND OF THE INVENTION

1. Field of the Invention

The present invention relates to a preparation of trans-polybutadiene using a novel bimetallic cobalt-aluminum adduct catalyst. More particularly, the present invention relates to preparing high trans-1,4-polybutadiene in the presence of a bimetallic cobalt-aluminum adduct catalyst having a stable oxidation state, which makes it possible to control the molecular weight of the polybutadiene and prevent the formation of gel and an oligomer so that the polybutadiene is odorless. The catalyst system comprising the bimetallic cobalt-aluminum metal adduct having a stable oxidation state makes it possible to prepare high trans-1,4-polybutadiene at high yield, can prevent an oligomer from being produced during polymerization, and thus can improve the physical properties of the trans-polybutadiene and prevent an odor from being caused by the oligomer. In addition, the reactivity of the catalyst can be controlled using novel activation systems comprising various allyloxy aluminum compounds.

2. Description of the Prior Art

Technology of preparing 1,4-trans-polybutadiene using butadiene as a monomer was reported long ago (Rubber Plast. Age 1963, 44, 42). In this technology, 1,4-trans-polybutadiene was prepared by polymerizing butadiene using a Ziegler-Natta catalyst system composed of a vanadium compound and alkyl aluminum. The prepared has a melting point (Tm) of 70~130° C. higher than room temperature, and thus has a shortcoming in that it is required to be aged at high temperatures before blending with rubber. Various methods of preparing 1,4-trans-polybutadiene using catalyst systems other than the vanadium catalyst system have been reported.

Japanese Patent Application No. 67187 (1967) discloses preparing a polybutadiene having a trans content of 75-80% using a catalyst combination composed of a covalent compound, organoaluminum compound and a phenol compound.

U.S. Pat. No. 5,089,574 discloses a method of preparing 1,4-trans-polybutadiene by polymerizing 1,3-butadiene using a catalyst system composed of cobalt carboxylate, alkyl phenol, dialkyl sulfioxide and organoaluminum. In this method, the molecular weight of 1,4-trans-polybutadiene is controlled using $CS_2$ in the catalyst system.

U.S. Pat. No. 5,448,002 discloses a method of preparing 1,4-trans-polybutadiene by polymerizing 1,3-butadiene using a catalyst system composed of cobalt carboxylate, alkyl phenol, dialkyl sulfioxide and organoaluminum. In this method, the molecular weight of 1,4-trans-polybutadiene is controlled using dialkyl sulfoxide in the catalyst system.

U.S. Pat. Nos. 6,310,152 and 6,617,406 disclose a method of preparing 1,4-trans-polybutadiene by polymerizing 1,3-butadiene in the presence of a catalyst system composed of cobalt carboxylate, para-alkylphenol or a para-alkylphenol/ortho-alkylphenol, and organoaluminum.

U.S. Pat. No. 5,834,573 discloses a method of preparing 1,4-trans-polybutadiene by polymerizing 1,3-butadiene in the presence of a catalyst system composed of cobalt acetylacetonate having an oxidation state of +3, alkylphenol, and organoaluminum.

U.S. Pat. No. 6,617,460 (2003) discloses a method of preparing 1,4-trans-polybutadiene using a $Co(Oct)_2$ catalyst activated by $Et_3Al$ treated with p-dodecylphenol and o-phenylphenol. The resulting polymer consists of 70-85% 1,4-trans-enchainment and 15-30% 1,2-vinyl enchainment and has a melting point (Tm) lower than room temperature. The polymer having this structure has various advantages in terms of physical terms, but an oligomer is produced as a byproduct and becomes an obstacle in commercial production of the polymer.

Meanwhile, U.S. Pat. Nos. 5,025,059 and 6,608,154 disclose preparing trans-polybutadiene using barium thymolate/trialkylaluminum/alkyllithium.

Meanwhile, the application of 1,4-trans-polybutadiene to tires is disclosed in U.S. Pat. No. 5,025,059 (1991), U.S. Pat. No. 5,626,697 (1997), U.S. Pat. No. 5,753,761 (1998), U.S. Pat. Nos. 6,581,659 and 6,765,063, etc.

Problems in the production of trans-polybutadiene using conventional catalysts are that the molecular weight of trans-polybutadiene is high and not easy to control, and thus the Mooney viscosity of its compound is too high to be processed during rubber processing, and that the conversion of a monomer into the resulting trans-polybutadiene is low.

SUMMARY OF THE INVENTION

Accordingly, the present invention has been made in view of the problems occurring in the prior art, and it is an object of the present invention to prepare trans-polybutadiene in the presence of a novel bimetallic cobalt-aluminum adduct catalyst system, which makes it possible to prevent the formation of an oligomer, control the molecular weight of the trans-polybutadiene and increase the conversion of a monomer into the trans-polybutadiene, thereby increasing the production of the trans-polybutadiene while overcoming a problem of poor processability thereof.

The present invention provides a method of preparing high trans-1,4-polybutadiene by polymerizing 1,3-butadiene or a butadiene derivative in the presence of a catalyst comprising a novel bimetallic cobalt-aluminum adduct, the adduct being represented by the following formula 1 and having a stable oxidation state:

$$Co(OOCCH_3)_2 \cdot Al(R_1)_n(R_5)_{3-n} \qquad \text{Formula 1}$$

The compound of formula 1 is a novel bimetallic cobalt-aluminum adduct catalyst composed of cobalt acetate and organic allyloxy aluminum (organic allyl oxide). The organic allyloxy aluminum has a coordination number of 3 and is formed by the reaction of an organoaluminum compound with a phenol-based compound. Each of $R_1$ and $R_5$ is the phenoxide of a phenol-based compound and may be a phenoxide having a phenyl, methyl, ethyl, propyl, t-butyl, dimethyl, thymol, octyl, nonyl or dodecyl group. $R_1$ is a ligand of allyloxy aluminum included in the synthesized allyloxy aluminum cobalt acetate adduct. $R_5$ is a ligand of allyloxy aluminum resulting from the substitution reaction of the synthesized allyloxy aluminum cobalt acetate adduct with a phenol-based compound.

More specifically, each of $R_1$ and $R_5$ may be $C_6H_5C_6H_4O$, $CH_3C_6H_4O$, $(C_2H_5)C_6H_4O$, $(CH_3)_2CHC_6H_4O$, $(CH_3)_3CC_6H_4O$, $(CH_3)_2C_6H_3O$, $(CH_3)_2CH(CH_3)C_6H_4O$, $(C_8H_{17})C_6H_4O$, $(CH_3)_3CCH_2C(CH_3)_2C_6H_4O$, $(C_9H_{19})C_6H_4O$ or $(C_{12}H_{25})C_6H_4O$.

DETAILED DESCRIPTION OF THE INVENTION

Figure 1:
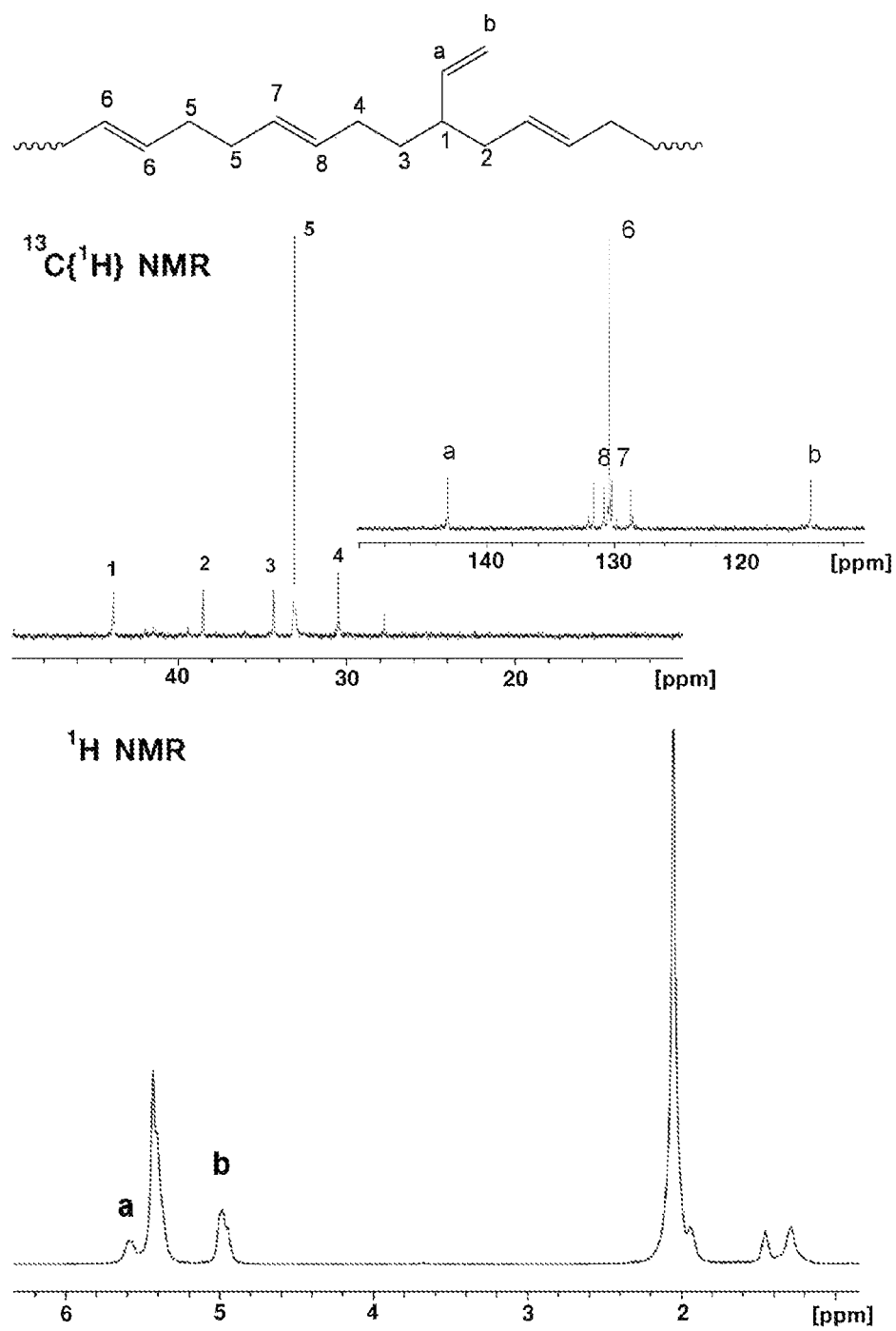
FIG. 1 shows the $^1H$ NMR and $^{13}C\{^1H\}$-NMR spectra of high trans-1,4-polybutadiene prepared using $(2-PhC_6H_4O)_3Al \cdot Co(OAc)_2$.
Figure 2:
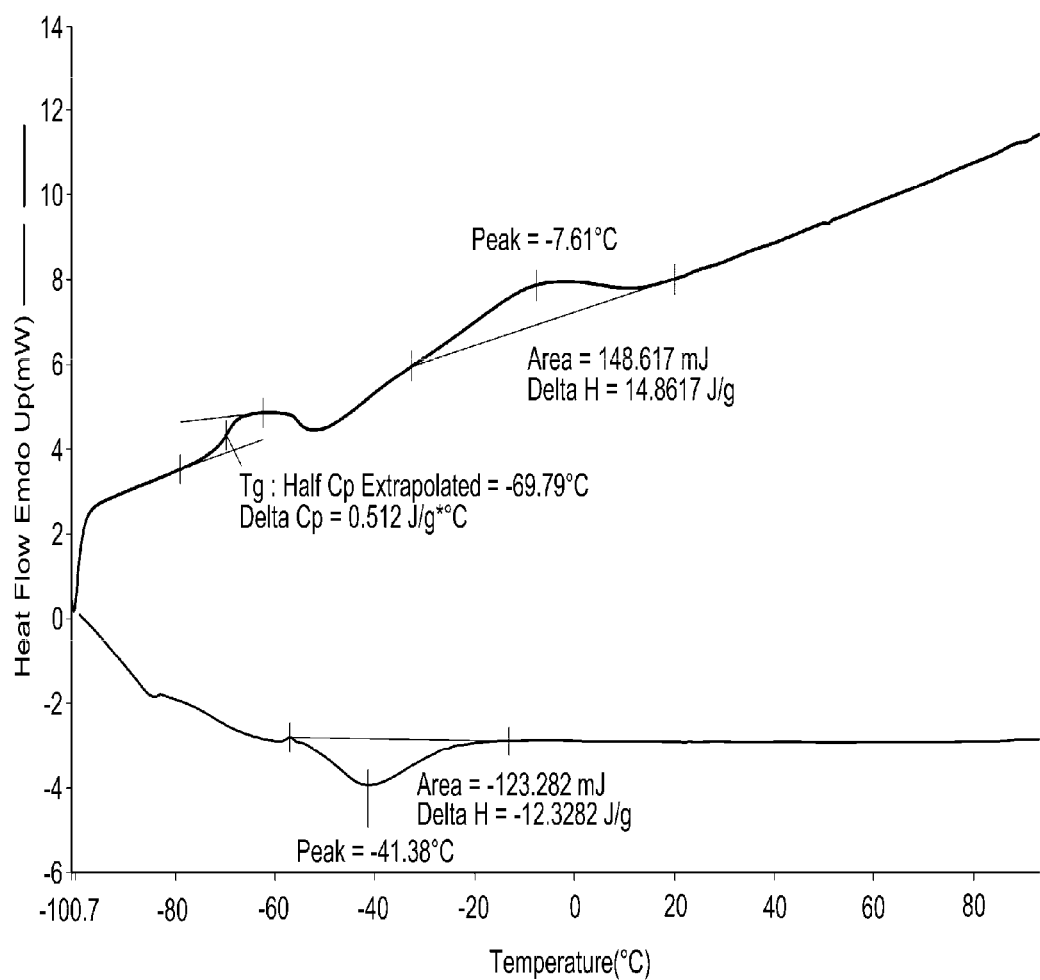
FIG. 2 shows the DSC (differential scanning calorimetry) thermograms of high trans-1,4-polybutadiene prepared using $(2\text{-PhC}_6\text{H}_4\text{O})_3\text{Al·Co(OAc)}_2$.
Figure 3:
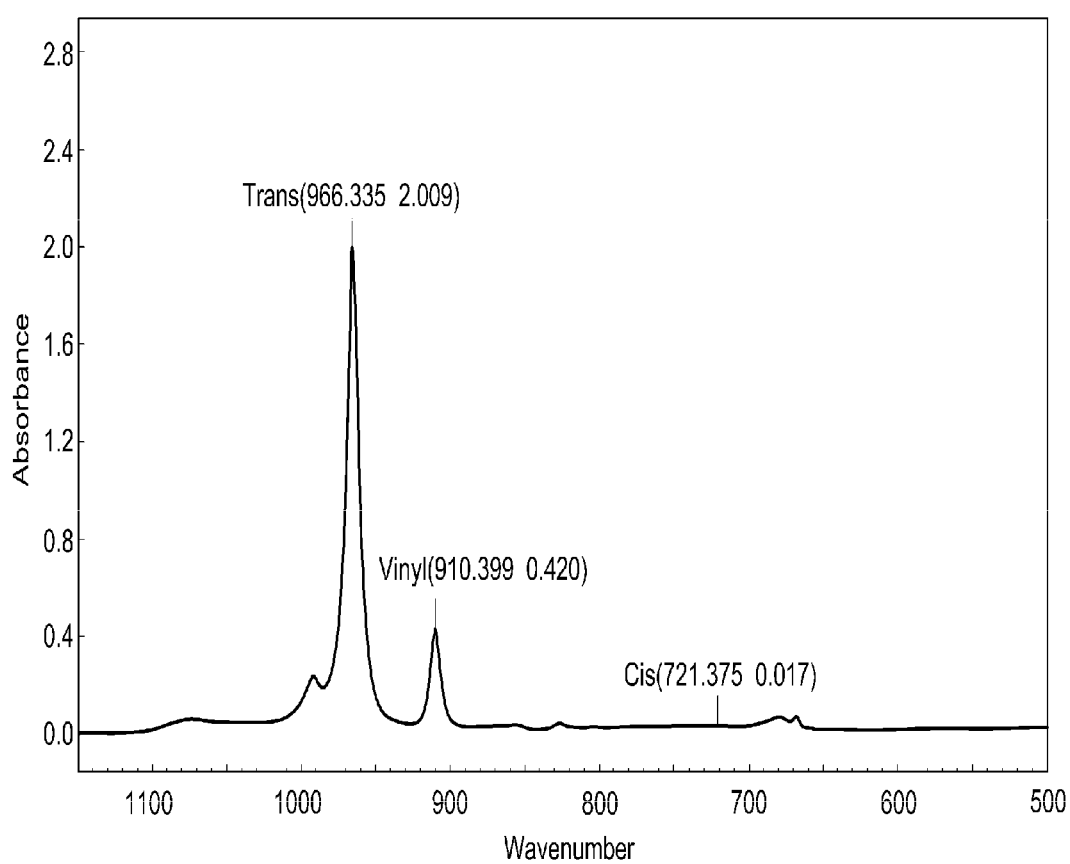
FIG. 3 shows the FT-IR spectrum of high trans-1,4-polybutadiene prepared using $(2\text{-PhC}_6\text{H}_4\text{O})_3\text{Al·Co(OAc)}_2$.

The present invention relates to a method of preparing 1,4-trans-polybutadiene using a novel catalyst system comprising a novel bimetallic cobalt-aluminum compound, in which the molecular weight of the trans-polybutadiene is easily controlled. The catalyst that is used in the present invention is a two-component catalyst composed of 1) a bimetallic cobalt-aluminum adduct compound and 2) an organic allyloxy aluminum (organic aluminum allyl oxide) compound.

The bimetallic cobalt-aluminum adduct compound is obtained by reacting organic allyloxy aluminum with a cobalt salt of organic or inorganic acid. The cobalt compound that is used in the present invention may be a cobalt salt of organic or inorganic acid. The cobalt compound is preferably a cobalt salt of organic acid having high solubility in an organic solvent and is more preferably cobalt carboxylate. Specific examples of cobalt carboxylate that is used in the present invention include cobalt acetate, versatate, cobalt octoate, cobalt naphthenate, cobalt stearate, and the like.

The organic allyloxy aluminum compound is obtained by the reaction of a phenol-based compound with an organoaluminum compound. The organoaluminum compound that is used in preparation of the organic allyloxy aluminum compound is a heteroatom-coordinated alkoxy aluminum compound and may be a compound having a coordination number of 3 and containing an alkyl, allyl, alkoxy or halogen group. Specific examples of the organoaluminum compound that is used in the present invention include trimethylaluminum, triethylaluminum, tripropylaluminum, tributylaluminum, triisobutylaluminum, trihexylaluminum and diisobutylaluminum hydride.

Examples of the phenol-based compound that is used in the preparation of the organic allyloxy aluminum compound include methylphenol, ethylphenol, butylphenol, octylphenol, nonylphenol, dodecylphenol, hexyloxyphenol, diethylphenol, dibutylphenol, dioctylphenol, didodecylphenol, tri-t-butylphenol, tri-octylphenol, tri-dodecylphenol, pentaethylphenol, pentabutylphenol, pentaoctylphenol, pentachlorophenol, pentabromophenol and the like.

The cobalt-aluminum adduct catalyst can be obtained by reacting 1 mole of organic allyloxy aluminum with 1 mole of a cobalt salt. The organic allyloxy aluminum compound can be prepared by reacting 1-3 moles of a phenol compound with 1 mole of organoaluminum.

The solvent that is used in the preparation of the catalyst system is not specifically limited and may be any solvent that is generally used in the art. Specifically, the solvent may be a non-polar solvent having no reactivity with the catalyst, such as cyclohexane, hexane, heptanes, toluene or xylene.

The organic allyloxy aluminum compound is used in an amount of 1-20 moles per mole of the cobalt-aluminum adduct. If the amount of organic allyloxy aluminum used is larger than moles, it will not be easy to control reactivity and activity, and for this reason, the amount of organic allyloxy aluminum used is preferably maintained within the above range. The catalyst is used in an amount of $0.5 \times 10^{-4}$-$5 \times 10^{-3}$ moles based on 100 g of the monomer. If the amount of catalyst used is less than $0.5 \times 10^{-4}$ moles, the reaction will be slow, and if the amount of catalyst used is more than $5 \times 10^{-3}$ moles, the reaction will occur rapidly, making it difficult to control temperature and physical properties.

1,3-butadiene or a butadiene derivative, which is used as the reactant, may be 1,3-butadiene, isoprene, 1,3-pentadiene, 2,3-dimethyl-1,3-butadiene, or myrcene.

The polymerization solvent that is used in the polymerization reaction may be a non-polar solvent selected from the group consisting of an aliphatic hydrocarbon solvent, cycloaliphatic butane, benzene, ethylbenzene or xylene. Specifically, the polymerization solvent may be selected from among pentane, hexane, isopentane, heptane, octane, isooctane, cyclopentane, methyl cyclopentane, cyclohexane, methylcyclohexane, ethylcycloghexane, benzene, toluene, ethylbenzene and xylene. Herein, the polymerization solvent is preferably free of oxygen and water.

The non-polar solvent is used in an amount that is 3-10 times that of the monomer. If the amount of solvent used is less than 3 times, it will be difficult to transport the polymerization solution, and if the amount of solvent used is more than 10 times, the reactivity will be reduced.

The polymerization is initiated in high-purity nitrogen atmosphere and is preferably carried out at a temperature ranging from −20 to 100° C. for a time ranging from 30 to 3 hours. Under such polymerization conditions, the polymer can be obtained at a yield of 70% or higher.

The polymerization process as described above can provide a high trans-1,4-polybutadiene having a trans content of 70% or higher and a molecular weight of 50,000-2,000,000.

Next, 2,6-di-t-butylparacresol as an antioxidant is added to the reaction product, after which methylalcohol or ethylalcohol may be added to terminate the reaction.

The molecular weight of the high trans-1,4-polybutadiene prepared using the novel catalyst system by the above-described process can be measured by gel permeation chromatography. The microstructure contents of the trans-polybutadiene are determined by the Morero method. Specifically, 40 mg of a solid rubber sample is completely dissolved in 5 mL of $CS_2$, after which the rubber solution is placed in KBr cells at intervals of 1 mm, and the contents in the solution are measured using an IR spectrophotometer (FTS-60A, BIO-RAD).

The IR peaks to be measured are the cis absorbance (AC) at 739 $cm^{-1}$, the vinyl absorbance (AV) at 912 $cm^{-1}$ and the trans absorbance (AT) at 966 $cm^{-1}$. Based on the measured absorbance, the cis content, the vinyl content and the trans content can be calculated using the following equations:

$$C = (1.7455 AC - 0.0151 AV) \quad (1)$$

$$V = (0.3746 AV - 0.0070 AC) \quad (2)$$

$$T = (0.4292 AT - 0.0129 AV - 0.0454 AC) \quad (3)$$

$$\text{Cis } (\%) = C/(C+V+T) \times 100 \quad (4)$$

$$\text{Trans } (\%) = T/(C+V+T) \times 100 \quad (5)$$

$$\text{Vinyl } (\%) = V/(C+V+T) \times 100. \quad (6)$$

The cis, trans and vinyl contents are measured by $^1$H-NMR and $^{13}$C{$^1$H}-NMR spectrophotometry. Specifically, solid rubber is completely dissolved in 0.5 mL of a deuterated solvent ($CDCl_3$, $C_6D_6$, $C_2D_2Cl_2$, etc.), followed by measurement at room temperature. The chemical shift of the deuterated solvent is used as the internal standard, and the cis, trans and vinyl contents are measured using the chemical shifts of resonance peaks of hydrogen and carbon corresponding to 1,4-trans and 1,2-vinyl.

Hereinafter, the present invention will be described in detail with reference to examples, but the scope of the present invention is not limited to these examples.

EXAMPLE 1

Synthesis of tri-2-phenylphenoxy aluminum

All reactions in all the examples mentioned below were carried out in an atmosphere of nitrogen or argon gas, and a dry box filled with nitrogen was used, if necessary. All the solvents used were anhydrous solvents and were, if necessary, purified by a dehydration process. 2-phenyl phenol (3.00 g, 17.6 mmol) was dissolved in toluene (24.0 mL), and the solution was well stirred at room temperature for 1 hour while a triethyl aluminum solution (1 M hexane, 6.00 mL, 6.00 mmole) was slowly added thereto, thereby obtaining a reaction product. The results of NMR analysis of the obtained tri-2-phenylphenoxy aluminum are as follows:

$^1$H NMR (C$_6$D$_6$): δ 7.25–6.75 (m, 48H, CH), 6.67 (t, J=6.4 Hz, 2H, 4-CH [bridge]), 6.36 (d, J=8.0 Hz, 4H, 2-CH) ppm.

$^{13}$C{$^1$H}NMR (100 MHz, C$_6$D$_6$, 298K): δ=153.35, 147.11, 139.88, 135.94, 133.51, 132.47, 132.13, 130.99, 129.87, 129.67, 129.27, 128.80, 128.71, 126.61, 125.63, 122.12, 121.16, 120.63 ppm.

EXAMPLE 2

Synthesis of Triallyloxy Aluminum Cobalt Acetate Adduct

The tri-2-phenylphenoxy aluminum (6.00 mmole) obtained in Example 1 was mixed with cobalt acetate (1.00 g, 6.00 mmole) in toluene, and the reaction mixture was well stirred at 70° C. for 24 hours. Then, the reaction mixture was filtered to remove undissolved impurities, and the remaining solvent was removed. The blue solid compound remaining after removal of the solvent was washed three times with hexane (5.0 mL), and then the remaining trace amounts of the solvent and volatile were removed. Yield: 3.57 g (85%).

EXAMPLE 3

Allyloxy Aluminum Ligand-Allyl Oxide Substation in Allyloxy Aluminum Cobalt Acetate Adduct The synthesized allyloxy aluminum cobalt acetate adduct 6.00 mmole) was dissolved in toluene (24.0 mL), and a phenol-based compound (e.g., CH$_3$C$_6$H$_5$, 0.64 g, 6.00 mmole) was added thereto. The reaction mixture was allowed to react with stirring at 70° C. for 24 hours. And the reaction mixture was filtered to remove undissolved impurities, followed by removal of the solvent. The remaining blue solid compound was washed three times with hexane (10.0 mL), and then the remaining trace amounts of the solvent and volatile were removed.

The reactions described in Examples 1 to 3 are shown in the following reaction scheme 1:

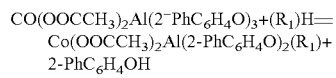
Co(OOCCH$_3$)$_2$Al(2$^-$PhC$_6$H$_4$O)$_3$+(R$_1$)H=
Co(OOCCH$_3$)$_2$Al(2-PhC$_6$H$_4$O)$_2$(R$_1$)+
2-PhC$_6$H$_4$OH      Reaction Scheme 1:

wherein R$_1$=C$_6$H$_5$C$_6$H$_4$O, CH$_3$C$_6$H$_4$O, (C$_2$H$_5$)C$_6$H$_4$O, (CH$_3$)$_2$CHC$_6$H$_4$O, (CH$_3$)$_3$CC$_6$H$_4$O, (CH$_3$)$_2$C$_6$H$_3$O, (CH$_3$)$_2$CH(CH$_3$)C$_6$H$_4$O, (C$_8$H$_{17}$)C$_6$H$_4$O, (CH$_3$)$_3$CCH$_2$C$_2$(CH$_3$)$_2$C$_6$H$_4$O, (C$_9$H$_{19}$)C$_6$H$_4$O or (C$_{12}$H$_{25}$)C$_6$H$_4$O.

EXAMPLE 4

Phenyl Phenoxy Diethyl Aluminum (Activating Agent)

2-phenylphenol (1.00 g, 6.00 mmole) was dissolved in toluene (12.0 mL), and then allowed to react with triethyl aluminum (1M hexane solution, 6.00 mL, 6.00 mmole). The compound formed by reaction of the phenol-based compound with the organoaluminum compound is shown in reaction scheme 2 below. The results of NMR analysis of the obtained phenyl phenoxy diethyl aluminum are as follows:

$^1$H NMR (C$_6$D$_6$): δ 7.43 (dd, J=1.6, 8.4 Hz, 2H, CH), 7.28 (dt, J=2.0, 6.8 Hz, 2H, CH), 7.20 (d, J=7.6 Hz, 1H, CH), 7.17 (t, J=4.8 Hz, 1H, CH), 7.11 (dd, J=1.6, 7.6 Hz, 1H, CH), 6.78 (dt, J=2.0, 8.0 Hz, 1H), 6.85 (dt, J=1.2, 7.2 Hz, 1H, CH), 0.96 (t, J=8.0 Hz, 6H, CH3), −0.03 (q, J=8.0 Hz, 4H, CH2) ppm.

$^{13}$C{$^1$H}NMR (100 MHz, C$_6$D$_6$, 298K): δ=114.90, 138.02, 134.52, 132.32, 130.16, 129.09, 128.77, 124.94, 122.29, 8.89, 0.48 ppm.

(R$_1$)$_H$+Al(R$_2$)$_3$=Al(R$_1$)(R$_2$)$_2$+(R$_2$)H      Reaction scheme 2 wherein R$_1$=C$_6$H$_5$C$_6$H$_4$O, CH$_3$C$_6$H$_4$O, (C$_2$H$_5$)C$_6$H$_4$O, (CH$_3$)$_2$CHC$_6$H$_4$O, (CH$_3$)$_3$CC$_6$H$_4$O, (CH$_3$)$_2$C$_6$H$_3$O, (CH$_3$)$_2$CH(CH$_3$)C$_6$H$_4$O, (C$_8$H$_{17}$)C$_6$H$_4$O, (CH$_3$)$_3$CCH$_2$C(CH$_3$)$_2$C$_6$H$_4$O, (C$_9$H$_{19}$)C$_6$H$_4$O or (C$_{12}$H$_{25}$)C$_6$H$_4$O; and R$_2$=CH$_3$, CH$_3$CH$_2$, (CH$_3$)$_2$CH, (CH$_3$)$_3$C, (C$_6$H$_{13}$) or (C$_8$H$_{17}$).

EXAMPLE 5

Polymerization

To a 2 L reactor filled with nitrogen, heptane (900 g), the allyl aluminum cobalt adduct, the same moles of phenyl phenoxy diethyl aluminum, and 1,3-butadiene (150 g) were sequentially added. The 1,3-butadiene was polymerized at 70° C. for 2 hours, methanol (1.0 phm) was used as a reaction-terminating agent, and 2,6-di-tert-butyl 4-methyl-phenol (1.0 phm) was used as an antioxidant. Table 1 below shows the results of polymerization of 1,3-butadiene, carried out in the presence of various aluminum cobalt adducts (Al (2-PhC$_6$H$_4$O)Et$_2$) was used as an activator in the substitution of 2-phenyl phenoxy with other phenol derivatives in Example 3).

TABLE 1

| | Catalyst | Conv. (%) | MW ×10$^{-3}$ | PDI (Polydispersity index) |
|---|---|---|---|---|
| 1 | Co(OOCCH$_3$)$_2$Al($_2$-PhC$_6$H$_4$O)$_3$ | 71 | 662 | 2.41 |
| 2 | Co(OOCCH$_3$)$_2$Al(2-PhC$_6$H$_4$O)$_2$(2-MeC$_6$H$_4$O) | 22 | 259 | 2.69 |
| 3 | Co(OOCCH$_3$)$_2$Al(2-PhC$_6$H$_4$O)$_2$(4-MeC6H4O) | 16 | 299 | 2.56 |
| 4 | Co(OOCCH$_3$)$_2$Al(2-PhC$_6$H$_4$O)$_2$(2-iPrC$_6$H$_4$O) | 38 | 785 | 2.32 |

TABLE 1-continued

| Catalyst | Conv. (%) | MW ×10⁻³ | PDI (Polydispersity index) |
|---|---|---|---|
| 6  Co(OOCCH$_3$)$_2$Al(2-PhC$_6$H$_4$O)$_2$(4-tBuC$_6$H$_4$O) | 25 | 692 | 2.04 |
| 7  Co(OOCCH$_3$)$_2$Al(2-PhC$_6$H$_4$O)$_2$(4-DodecylC$_6$H$_4$O) | 38 | 491 | 2.84 |

Table 2 below shows the results of polymerization of 1,3-butadiene, carried out in the presence of a variety of allyloxy alkyl aluminum activators (various activators obtained in Example 4 were used; and Co(OOCCH$_3$)$_2$Al(2-PhC$_6$H$_4$O)$_3$ was used as a catalyst). Table 3 below shows the results of FT-IR analysis and NMR analysis of the microstructures of the high trans-1,4-polybutadiene obtained by polymerization in the presence of (2-PhC$_6$H$_4$O)$_3$Al. Co(OAc)$_2$.

TABLE 2

| Activator | Conv. (%) | MW ×10⁻³ | PDI (Polydispersity index) |
|---|---|---|---|
| 1  Al(2-PhC$_6$H$_4$O)Et$_2$ | 76 | 730 | 2.20 |
| 2  Al(2-MeC$_6$H$_4$O)Et$_2$Al | 44 | 456 | 2.30 |
| 3  Al(4-MeC$_6$H$_4$O)Et$_2$Al | 69 | 665 | 2.19 |
| 4  Al(2-iPrC$_6$H$_4$O)Et$_2$Al | 26 | 430 | 2.19 |
| 5  Al(4-tBuC$_6$H$_4$O)Et$_2$Al | 19 | 404 | 2.20 |
| 6  Al(4-iPrC$_6$H$_4$O)Et$_2$Al | 28 | 428 | 2.87 |
| 7  Al(4-dodecylC$_6$H$_4$O)Et$_2$Al | 70 | 684 | 2.47 |

TABLE 3

|  | FT-IR (%) | NMR (%) |
|---|---|---|
| Cis (%) | 2.3 | 3.1 |
| Trans (%) | 82.6 | 87.8 |
| Vinyl (%) | 15.1 | 9.1 |

EXAMPLE 6

Measurement of Physical Properties of Rubber Compound

Trans-1,4-polybutadiene (hereinafter referred to as t-BR) was mixed according to the composition shown in Table 4 below at 120° C. using a 500 cc Brabender, and the mixture was blended at 80° C. using a roll mill. Then, the mixture was subjected to vulcanization at 160° C. using a press for a time period measured by RPA.

The measured physical properties are shown in Table 5 below.

TABLE 4

| NR | 50.00 |
|---|---|
| t-BR | 50.00 |
| ZnO | 5.00 |
| St-A | 3.00 |
| N330 | 45.00 |
| TDAE oil | 6.00 |
| Total | 159.00 |
| CMB | 159.00 |

TABLE 4-continued

| Sulfur | 2.00 |
|---|---|
| TBBS | 1.00 |
| Total | 162.00 |

TABLE 5

|  | Example 1 | Example 2 | Comparative Example |
|---|---|---|---|
| t-BR polymerization catalyst | Co(OOCCH$_3$)$_2$Al(2-PhC$_6$H$_4$O)$_3$/Al(2-PhC$_6$H$_4$O)Et$_2$ | Co(OOCCH$_3$)$_2$Al(2-PhC$_6$H$_4$O)$_3$/dodecylphenol/DIBAH | Co(2-ethyl-hexanoate)$_2$/dodecylphenol/DIBAH |
| Type of rubber | NR/t-BR | NR/t-BR | NR/t-BR |
| Compound Mooney viscosity | 85.5 | 79 | 78.3 |
| Hardness (shore A) | 61 | 69.2 | 65.3 |
| 100% Modulus (kgf/cm$^2$) | 20.4 | 21.3 | 18.5 |
| 300% Modulus (kgf/cm$^2$) | 97.6 | 77.5 | 74.2 |
| Tensile strength (kgf/cm$^2$) | 221.9 | 190.3 | 184.3 |
| Elongation at break (%) | 497 | 526.5 | 592.1 |
| DIN abrasion (mg) | 0.0516 | 0.0450 | 0.0537 |

COMPARATIVE EXAMPLE 1

2-phenyl phenoxy was substituted with other phenoxide derivatives as described in Example 3, and the influence of the resulting compounds on polymerization was examined. The compounds formed by the substitution of the 2-phenyl-phenoxy aluminum cobalt adduct with various phenoxide derivatives are as shown in reaction scheme 1 above.

Table 1 above shows the results of polymerization carried out in the presence of the aluminum cobalt adduct catalysts substituted with various phenoxide derivatives. 2-phenyl-phenoxy diethyl aluminum was also used. It was evaluated that the aluminum cobalt catalyst system substituted with 2-phenylphenoxide alone had higher activity than those substituted with 2-methylphenoxide, 4-methylphenoxide, 4-iso-propylphenoxide or 4-tert-butylphenoxide. With respect to the steric effect, it was evaluated that the catalyst having an iso-propyl or t-butyl substituent at the ortho position had high polymerization activity.

COMPARATIVE EXAMPLE 2

The activator compounds formed by the exchange reaction between various different phenoxide derivatives and aluminum are shown in reaction scheme 2 above. Table 2 above shows the results of polymerization carried out in the presence of various phenoxides.

Among the activators obtained in Example 4, 2-phenylphenoxy diethyl aluminum showed the highest activity. In addition, 4-methylphenoxy ethyl and 4-methyl-iso-propylphenoxy diethyl aluminum showed improved activity compared to aluminoxides having a 2-methylphenoxy diethyl, 2-iso-propylphenoxy diethyl or 2-t-butylphenoxy diethyl group.

As described above, when 1,4-trans-polybutadiene is prepared in the presence of the catalyst system comprising the novel bimetallic cobalt-aluminum adduct, formation of a butadiene oligomer and the occurrence of odor by the oligomer can be prevented, because the oxidation state and structure of the catalyst are stable. In addition, the molecular weight of high trans-1,4-polybutadiene is easily controllable, and thus gel formation can be prevented.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A catalyst system for the preparation of 1,4-trans-polybutadiene, wherein the catalyst system comprises:
 a bimetallic cobalt-aluminum adduct comprising a cobalt carboxylate and an organic allyloxy aluminum; and
 an activating agent comprising an organic allyloxy aluminum compound formed by reacting a phenol-based compound with an organoaluminum compound.

2. The catalyst system of claim 1, wherein the bimetallic cobalt-aluminum adduct is prepared using one or more cobalt carboxylates selected from the group consisting of cobalt acetate, versatate, cobalt octoate, cobalt naphthenate, and cobalt stearate.

3. The catalyst system of claim 1, wherein the phenol-based compound is one or more selected from the group consisting of methylphenol, ethylphenol, butylphenol, octylphenol, nonylphenol, dodecylphenol, hexyloxyphenol, diethylphenol, dibutylphenol, dioctylphenol, didodecylphenol, tri-t-butylphenol, tri-octylphenol, tri-dodecylphenol, pentaethylphenol, pentabutylphenol, pentaoctylphenol, pentachlorophenol, and pentabromophenol, and the organoaluminum compound is one or more selected from the group consisting of trimethylaluminum, triethylaluminum, tripropylaluminum, tributylaluminum, triisobutylaluminum, trihexylaluminum and diisobutylaluminum hydride.

4. The catalyst system of claim 1, wherein the bimetallic cobalt-aluminum adduct is obtained by reacting 1-2 moles of organic allyloxy aluminum with 1 mole of a cobalt salt, and the organic allyloxy aluminum compound is obtained by reacting 3 to 4 moles of a phenol-based compound with 1 mole of organoaluminum.

5. The catalyst system of claim 1, wherein a solvent that is used for preparation of the catalyst system is selected from the group consisting of cyclohexane, hexane, heptane, toluene and xylene.

6. The catalyst system of claim 1, wherein the catalyst system is composed of 1 to 20 moles of the organic allyloxy aluminum relative to 1 mole of the cobalt-aluminum adduct.

7. A method of preparing high trans-1,4-polybutadiene in the presence of a catalyst system composed of a bimetallic cobalt-aluminum adduct and an organic allyloxy aluminum compound as set forth in claim 1.

8. The method of claim 7, wherein the high trans-1,4-polybutadiene is prepared using 1,3-butadiene or a butadiene derivative as a reactant.

9. The method of claim 7, wherein the catalyst of the catalyst system is used in an amount of $0.5 \times 10^{-4}$ to $5 \times 10^{-3}$ moles relative to 100 g of a reactant monomer.

10. The method of claim 7, wherein a polymerization solvent is used for preparation of the high trans-1,4-polybutadiene and is selected from the group consisting of pentane, hexane, isopentane, heptane, octane, isooctane, cyclopentane, methylcyclopentane, cyclohexane, methylcyclohexane, ethylcyclohexane, benzene, toluene, ethylbenzene and xylene.

11. The method of claim 7, wherein the high trans-1,4-polybutadiene has a weight-average molecular weight of 50,000 to 1,000,000.

* * * * *